Aug. 10, 1965 KARL-HEINZ OEHLRICH ETAL 3,199,269

PARTICLE-FROM-GAS SEPARATORS

Filed April 25, 1960

8 Sheets-Sheet 1

Aug. 10, 1965 KARL-HEINZ OEHLRICH ET AL 3,199,269

PARTICLE-FROM-GAS SEPARATORS

Filed April 25, 1960

8 Sheets-Sheet 7

Aug. 10, 1965 KARL-HEINZ OEHLRICH ETAL 3,199,269

PARTICLE-FROM-GAS SEPARATORS

Filed April 25, 1960

8 Sheets-Sheet 8

United States Patent Office 3,199,269
Patented Aug. 10, 1965

3,199,269
PARTICLE-FROM-GAS SEPARATORS

Karl-Heinz Oehlrich and Karl Rudolf Schmidt, Erlangen, Germany, assignors to Siemens-Schuckertwerke Aktiengesellschaft, Berlin-Siemensstadt, Germany, a corporation of Germany Filed Apr. 25, 1960, Ser. No. 24,391
Claims priority, application Germany, Apr. 28, 1959, S 62,797
5 Claims. (Cl. 55—261)

Our invention relates to particle-from-gas separators, for example those of the cyclone, multiclone and other centrifugally or gravitationally operating types, and has for its general object to improve the efficacy of such apparatus with the aid of relatively simple mechanical means of small space requirements.

To this end, and in accordance with our invention, we superimpose upon the particle-laden gas flow of a cyclone or other centrifugally operating separator a circulatory secondary flow whose planes of circulation are generally transverse to the plane of centrifugal action and which is caused by forming in the primary gas flow a vortex source and a vortex sink above structural or virtual "solid ground" or "rough ground." More specifically, we produce the secondary circulatory gas flow by agitating the primary gas flow in a direction generally tangential and inclined to the primary-flow axis by blowing additional gas quantities through nozzle means, such as slots or nozzle pipes, into the primary flow. As a result, the particle-laden primary gas flow is subjected to a superimposed particle separating action due to "relative forces" in accordance with the principles explained in the copending application Serial No. 835,886, filed August 25, 1959, by Oehlrich et al., assigned to the assignee of the present invention. The copending application may be referred to for a detailed description of the phenomena involving the production of separatingly acting "relative forces" in flowing media by subjecting such media to a circulatory secondary flow—preferably combining a potential flow and a rotary flow—above a so-called "solid ground," such forces occurring particularly in the resulting vortex source.

As a rule, a separator to which our invention is applicable comprises a vessel structure having a generally vertical axis and forming a centrifugal-action separator chamber of circular horizontal cross section. This essentially conventional vessel structure has a main inlet duct for supplying a primary flow of particle-laden gas, a gas outlet portion which communicates with the separator chamber above the main inlet duct and extends upwardly away from the chamber, and a dust discharge pipe extending away from the bottom portion of the vessel. In conjunction with such a vessel structure, as embodied, for example, in conventional cyclones and multiclones involving centrifugal particle-from-gas separation and discharge of the separated particle material by gravity, the secondary-gas supply means required in accordance with our invention for producing a vortex sink and a vortex source in the main gas flow, may be connected with the main gas flow at a location spaced from the centrifugal-action chamber proper in serially spaced relation to the primary gas flow. Accordingly, the nozzle pipes or other secondary-gas supply means are located either in the main gas-inlet duct of the vessel structure ahead of the centrifugating separator chamber, or they are located in the gas-outlet portion behind the separator chamber proper, it being also within the purview of our invention to simultaneously use both types of arrangement. Such separators are to some extent similar to a variety of conventional cyclones, multiclones or other separators. Hence the just-mentioned features offer the advantage of applying the invention to separators of existing types while requiring a relatively small expenditure in additional equipment as will more fully appear hereinafter.

However, according to another feature of our invention, the nozzle pipes or other secondary-gas supply means are located adjacent to the main separator chamber so that the relative-force action and the conventional centrifugal separator action are directly combined with each other. The latter principle according to the invention results in a variety of novel separator designs, greatly different in construction and appearance from those heretofore available. It will be understood, of course, that a separator on the combinative principle just mentioned may also be provided with additional secondary-gas supply means located ahead of, or behind, the centrifugal-action chamber proper relative to the direction of the primary gas flow.

Aside from the improvement in effectiveness, the invention also affords a stabilization of the gas-flow conditions, and a reduced wear of the vessel and duct materials so that they can be given a smaller wall thickness without reducing the useful life of the equipment.

The foregoing and other objects, advantages and features of our invention, said features being set forth with particularity in the claims annexed hereto, will be apparent from, and will be mentioned in, the following description of the embodiments of separators according to the invention illustrated by way of example on the accompanying drawings in which:

FIG. 1*a* is a sectional front view of a cyclone-type separator, and FIG. 1*b* is a corresponding top view;

FIG. 2*a* and FIG. 2*b*; FIG. 3*a* and FIG. 3*b*; FIG. 4*a* and FIG. 4*b* are respective front and top views of three other separators;

FIG. 5 is a sectional front view of another separator, FIG. 5*a* is a sectional front view of a modified gas-outlet portion of the separator, and FIG. 5*b* is a sectional front view of a modified embodiment;

FIG. 6*a* is a sectional front view and FIG. 6*b* a top view of still another separator, and FIGS. 7*a* and 7*b* show respective sectional front views and top views of a further embodiment;

FIGS. 8 to 14 are respective sectional front views of seven additional embodiments;

FIG. 15*a* is a sectional front view and FIG. 15*b* a top view of another separator;

The four separators illustrated in FIGS. 1*a* through 4*b* are essentially of the conventional cyclone type in which the dust-laden smoke gas is supplied tangentially into a separator chamber. The walls of the separator vessel comprise an upper cylindrical portion 1 merging downwardly into a conical portion 2, both enclosing the main centrifugal-action chamber of the separator. The tapering bottom of the conical portion 2 is continued into a duct or pipe 3 for eliminating the separated dust particles.

Figures 1A, 1B, 2A, 2B, 3A, 3B:
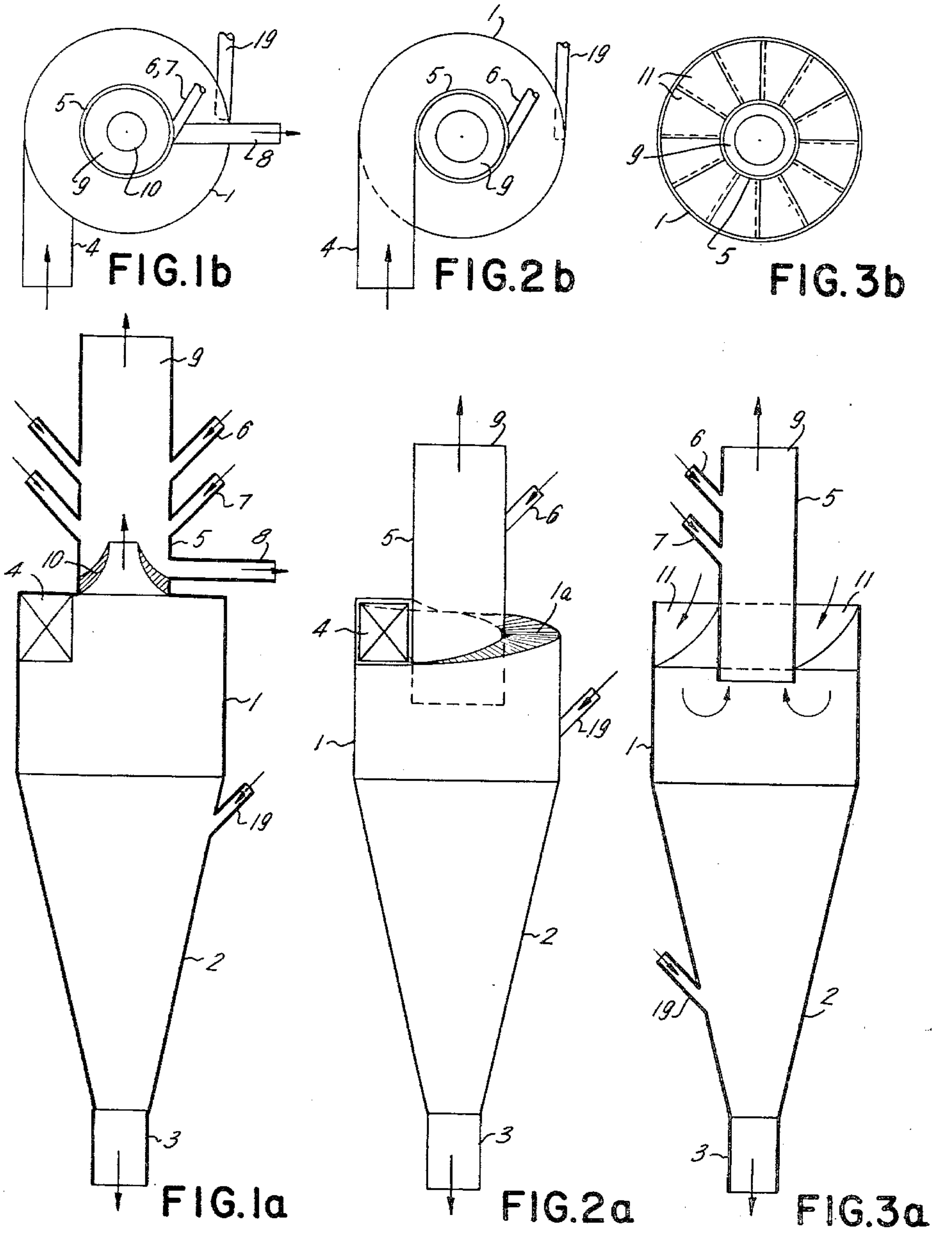

The smoke gas to be liberated from dust in the device of FIGS. 1*a*, 1*b* is supplied through a gas-inlet duct 4 which is joined with the cylindrical portion 1 near the top thereof. The duct 4 enters tangentially so that the dust-laden gas is driven to rotate in the top portion 1 with the effect of centrifugally separating the entrained dust which then drains along the wall of the conical portion 2 into the dust discharge pipe 3. The relatively clean gas, leaving at 9, passes from the separator chamber through a gas-outlet conduit 5 extending upwardly from the top of the vessel portion 1. In the separators according to FIGS. 2*a*, 2*b* and 3*a*, 3*b* and 4*a*, 4*b* the lower end of the gas-outlet conduit 5 protrudes downwardly into the separator chamber.

The devices according to FIGS. 1*a* to 3*b* are provided with auxiliary nozzle pipes 6, 7 which serve to supply air or gas into the main flow on one or more locations along the gas path. Similar nozzle tubes 19 may be provided on vessel portions 1 or 2 for similar or stabilizing purposes. The nozzle pipes 6 and 7 extend in a downwardly inclined direction relative to the axis of the main gas flow and substantially in a tangential direction to the main flow. The secondary air or gas may be supplied from a separate source of gas under pressure or it may be branched off the main gas flow either on the outlet side or the inlet side of the separator.

During operation, a coarse dust separation is effected by centrifugal action in the main separator chamber of the cyclone in the conventional manner. The secondary-gas nozzle tubes 6, 7 superimpose a further separating effect upon the gas flow with the result that any residual dust quantities leaving the main separator chamber are also elimated. It is preferable to provide the separator, near but below the entrance openings of the nozzle tubes, with a collector surface from which the additionally separated dust can be conveniently removed. For this purpose the device according to FIGS. 1*a*, 1*b* is provided with an insert structure 10 which forms an annular dust collecting trough beneath the openings of the lowermost nozzle tubes 7. The collected dust is removed or exhausted from the annular trough through an additional dust-outlet pipe 8.

In the embodiments according to FIGS. 1*a* to 4*b*, the elimination of residual gas is effected within the gas-outlet conduit 9 by superimposing upon the gas flow in this conduit a circulatory secondary flow due to occurrence of a vortex source and a vortex sink spaced from each other in the axial direction of the primary gas flow. In the event the flow of gas in the gas-outlet conduit 5 is predominantly laminar, the nozzle tubes 6, 7 may be so directed that the superimposed action is either clockwise or counterclockwise. However if the gas flow in outlet conduit 5 still has appreciable rotation due to the centrifugal action in the separator chamber proper, the nozzle tubes 6, 7 are preferably so directed as to impose upon the gas flow an action in the sense of rotation opposed to that inherent in the primary gas flow. The gases leaving the outlet opening 9 of conduit 5 are liberated from dust to a considerably greater extent than obtainable with conventional cyclones.

In the separator according to FIG. 2*a*, the top of vessel portion 1 forms a helical guide surface 1*a* constituting a continuation of the tangential gas-inlet duct 4. In the separator according to FIGS. 3*a* and 3*b* the dust-laden gas enters from above into the cylindrical portion 1 of the separator vessel which is provided with guide blades 11 of helical shape in order to impart the necessary rotating motion to the gas.

Figures 4A, 4B, 5:
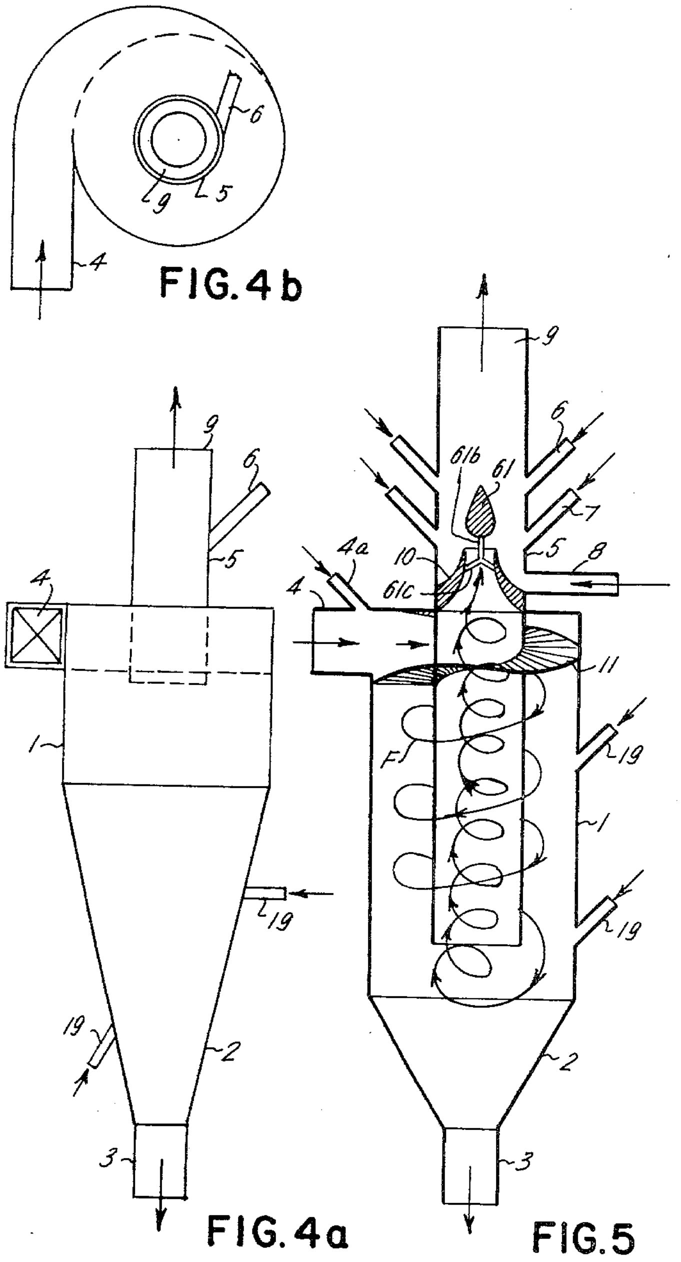

The separator illustrated in FIG. 5 is of a type generally known for use in multiclones. The upper cylindrical portion 1 of the separator vessel is supplied with the dust-laden gas through a tangential inlet duct 4 which cooperates with a helical guide sheet 11 in the upper portion of the vessel portion 1 for imparting rotation to the gas flow. The superimposed circulatory flow for additional dust separation is produced in the gas-outlet duct 5 which protrudes downwardly through the main dust separating chamber of the vessel to the vicinity of the conical vessel portion 2. The gas-outlet conduit 5 is provided with lateral nozzle tubes 6, 7 for the supply of secondary gas under pressure as described above with reference to the preceding embodiments. An annular insert structure 10 forms a collecting trough for the residual dust particles which are discharged through a pipe 8 in the direction of the indicated arrow.

The multiclone separator according to FIG. 5 is further provided with nozzle tubes 4*a* which enter into the gas-supply duct 4 in a tangential direction and in inclined relation to the main gas flow in duct 4. As a result, a circulatory secondary flow is already imposed upon the primary gas flow before it enters into the centrifugal-action chamber in vessel portion 1. In this manner the coarse separation of dust is improved.

Figures 13, 14:
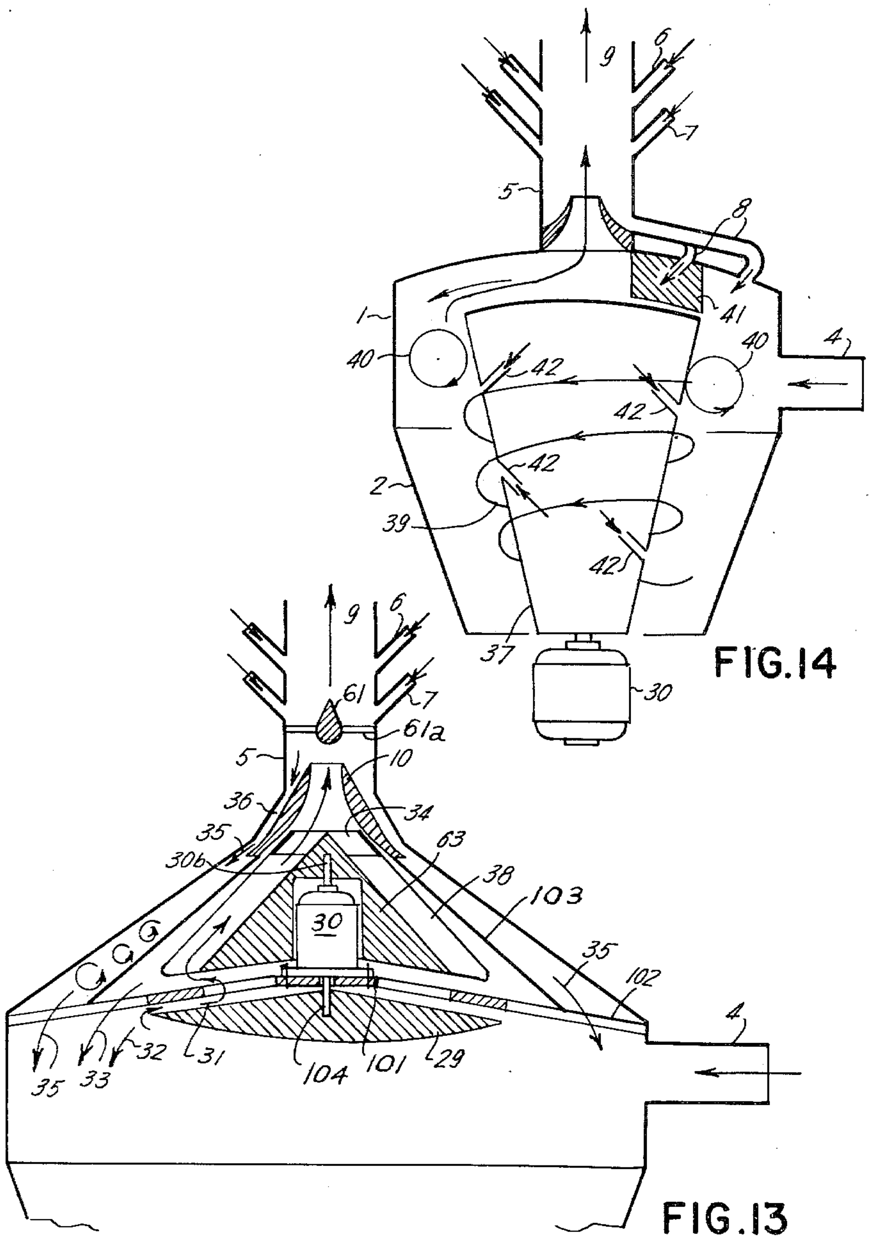

Shown at 61 in FIG. 5 and FIG. 13 is a drop-shaped insert 61, called "dobbas" which has the effect of fixing the location of the vortex source thereby stabilizing the flow conditions. Such an insert body 61 is also applicable with all other illustrated embodiments. The dobbas 61 is supported by bracket bars 61*a* from the walls of conduit 5. Similar conventional support bars or brackets 61*b* and 61c are used for supporting element 61 in FIG. 5.

The nozzle tubes 19 shown in FIG. 5 also supply a flow of secondary air and are oriented in an inclined tangential direction relative to the primary gas flow in the separator vessel.

Figure 5A:
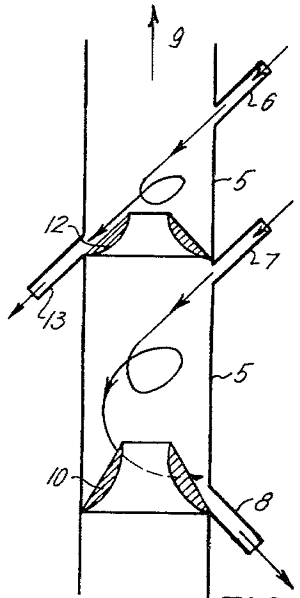

FIG. 5*a* shows only the gas-outlet portion of a separator otherwise corresponding to FIG. 5. The gas-outlet duct is provided with secondary-gas nozzle pipes 6 and 7 located one above the other and is also equipped with two insert bodies 10 and 12 which form respective annular dust-collecting troughs beneath the opening of nozzle tube 7 and nozzle tube 6 respectively. The dust collected at insert body 10 is discharged through a dust pipe 8, and the dust collected at insert 12 is discharged through a pipe 13. It will be understood that a corresponding plurality of dust-collecting trough spaces may also be used in connection with the other separators described herein.

Figure 5B:
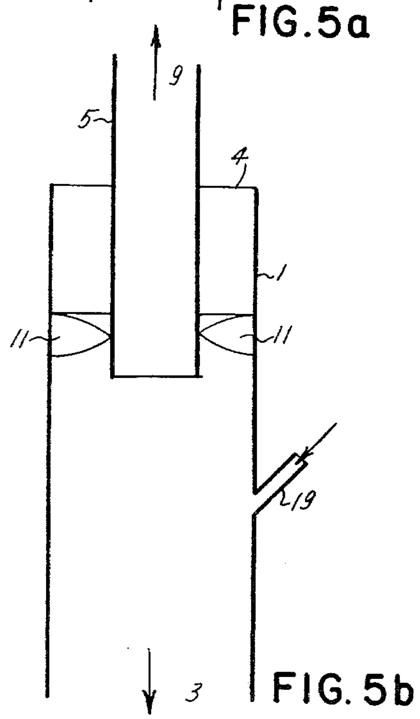

Another dust separator for use in multiclones is shown in FIG. 5*b*. In this embodiment the dust-entraining downward flow of gas from the separator chamber proper to the dust-outlet portion 3 of the vessel is stabilized by a downwardly inclined and tangential secondary-air nozzle pipe 19 whose action not only increases the degree of dust separation but also reduces the wear imposed upon the vessel structure. The separator is shown equipped with helical guide sheets 11 which are preferably so designed that their cross section tapers from the peripheral wall of the vessel portion 1 toward the gas-outlet conduit 5. These blades are fastened to the cylindrical vessel portion 1. The gas is supplied through the inlet portion 4 and is caused to circulate when passing along the guides 11.

Figure 6A:
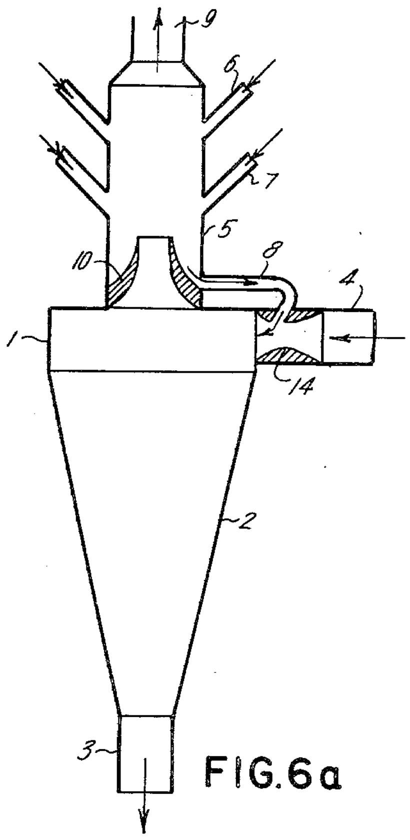
Figure 6B:
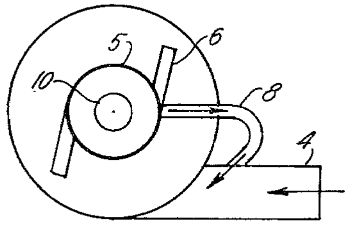

The separator illustrated in FIGS. 6*a* and 6*b* is essentially similar to the one described above with reference to FIGS. 1*a*, 1*b*, but is provided with a second dust discharge pipe 8 which opens into the gas-inlet conduit 4 of the separator. It is preferable to provide the gas-inlet duct 4 with an insert 14 which narrows the inlet cross section in Venturi fashion to produce an increased flow velocity at the location where the dust-laden gas from pipe 8 enters into the primary flow. The pipe 8 may be given a curved shape at the location where it enters into the gas inlet duct 4 so that the dust particles enter into the primary flow in a tangential or inclined-tangential direction, thus also acting as a secondary-gas nozzle with an effect similar to that of nozzle pipes 6, 7. The dust removed through pipe 8 passes back into the separator chamber together with the dust-laden gas supplied to the conduit 4. The entire separated dust quantity ultimately drains through the dust-outlet portion 3 of the vessel. The dust quantity collecting in the annular space about the insert 10, when reaching the gas-inlet conduit 4, has a sufficiently great concentration to be effectively separated and removed in the main centrifugal-action chamber of the vessel.

Figure 7A:
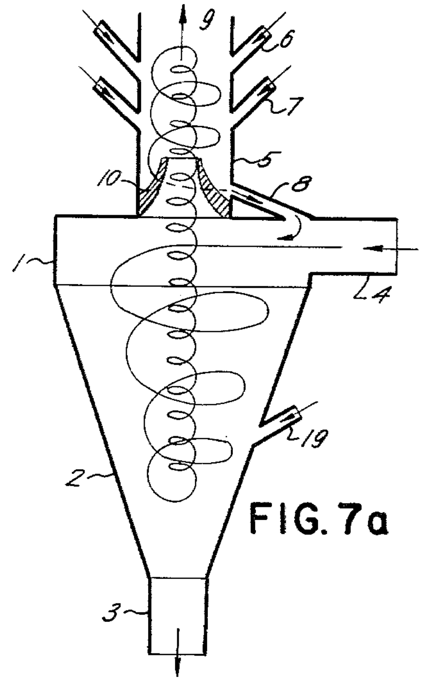
Figure 7B:
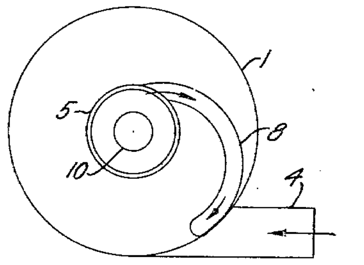

FIGS. 7*a* and 7*b* also illustrate an embodiment in which the separated fine dust particles are eliminated together with the coarse particles. While according to FIG. 6 the dust pipe 8 opens into the gas-inlet conduit, the corresponding pipe 8 in FIGS. 7*a*, 7*b* communicates with the upper vessel portion 1 at a location near and above the opening of the gas-inlet duct 4. As shown in FIG. 7*b*, the dust pipe 8 is preferably so directed as to extend tangentially or in an inclined-tangential direction relative to the vessel axis.

Figure 8:
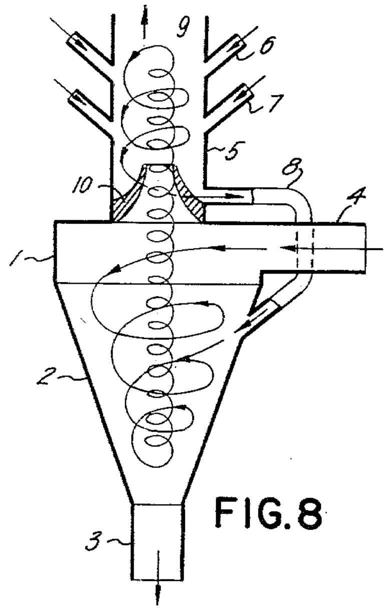

In the modified embodiment according to FIG. 8, the above-described dust-discharge pipe 8 opens into the vessel portion 2 of the separator at a location beneath the gas-inlet conduit 4. In this case, too, the pipe 8 preferably joins the separator vessel in a tangential or inclined-tangential direction.

Figure 9:
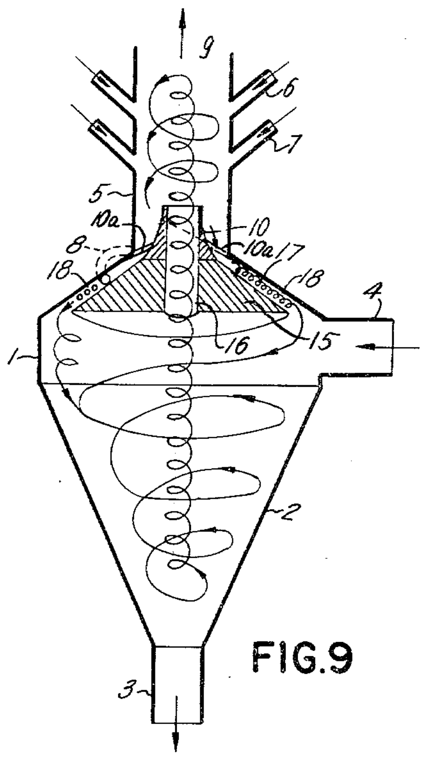

The separator shown in FIG. 9 is provided with a frusto-conical insert body 15 mounted in the upper portion 1 of the separator vessel structure in spaced relation from its top so as to form an annular and generally conical passage for the gas flow from the centrifugal-action chamber to the gas-outlet conduit 5. As shown in FIG. 9, the body 15 may be suspended from insert body 10, which in turn is supported by conventional support bars or brackets 10*a* from the conduit walls. The bottom side of insert body 15 acts as a vortex sink. If desired, the insert body 15 can be made rotatable and may be driven by a motor as shown in FIG. 13. The body 15 has an axial center bore 16 through which the main gas flow ascends in the schematically illustrated manner. The annular space formed about an insert 10 at the top of body 15 collects the fine residual dust particles that are separated in the outlet conduit 5 by the action of the nozzle tubes 6, 7. The annular space about the insert 10 communicates with a number of dust discharge pipes 8 similar to those shown in the preceding illustrations, or the dust collecting about the insert 10 is simply permitted to drain through the annular gap 17 so as to drop into the chamber enclosed by the upper vessel portion 1. By rotating the frusto-conical body 15 the formation of a vortex filament in the gas flow can be promoted, thereby augmenting the separating action. When providing a dust discharge pipe 8 entering at 18 as shown by broken lines, advantage can be taken of having such dust pipes enter in an inclined or tangential direction for the purpose of producing an action similar to that of nozzle tubes 6, 7. The flow in the gap 17 does not only rotate as a whole about the frusto-conical body 15 but also forms eddies due to friction at the gap walls, and such eddies produce a rotating vortex filament in addition to the general rotational motion of the gas flow.

Figures 10, 11, 12:
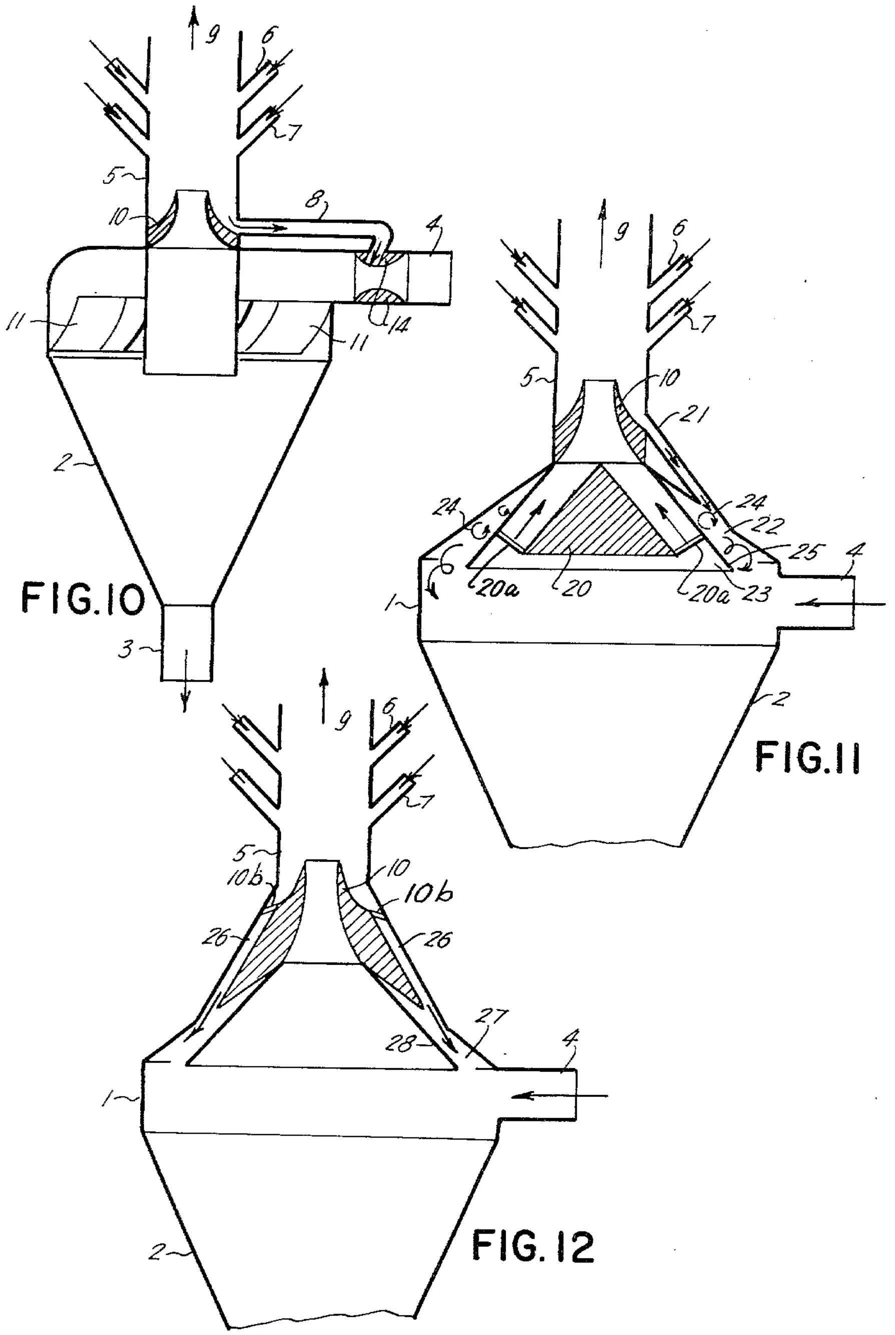

The separator according to FIG. 10 is generally similar to the one described above with reference to FIGS. 6*a*, 6*b*. The fine dust separated in the annular trough space about the insert 10 is supplied through one or more pipes 8 to the gas-inlet conduit 4 which is preferably provided with an insert 14 for producing an increased flow velocity at this location. The influx of dust and gas from the pipe 8 takes place in such a manner that a vortex filament already commences from this location inwardly toward the separator space and causes the main gas flow to perform a circulatory motion in addition to its primary forward travel. Additional rotation is applied to the gas flow by a ring of guide blades 11. It is favorable to attach these blades not at a central location but only at the periphery in order to minimize frictional wear of the blades by the dust particles.

The modified separator illustrated in FIG. 11 is provided with an insert body 20 of conical shape mounted near the upper end of the cylindrical vessel portion 1. The bottom side of insert body 20 is shaped to promote the formation of a vortex sink. The fine dust separated from the annular space about the insert body 10 passes through one or more channels 21 into a gap space 22 concentrically surrounding another gap space 23. The channels 21 preferably enter into the annular gap space 22 in an inclined tangential direction. Due to the simultaneous downward and rotating flow, Taylor eddies are generated in the gap 22 as is schematically indicated by circular arrows 24. If desired, the insert body 20 can be kept in rotation. However, the sheet-metal body 25, forming a partition between the two annular gap spaces 22 and 23 may also be rotated during operation of the separator. Conventional support bars or brackets 20*a* may be used to suspend the body 20 from the sheet metal partition 25, as shown in FIG. 11.

In the embodiment shown in FIG. 12, a free passage from the lower to the upper vessel space is provided. The fine dust removed from the annular channel about the insert body 10 passes through one or more slot-shaped channels 26 into an annular gap space 27. The annular insert 10 of FIG. 12 may be supported from the conduit walls by conventional support bars or brackets 10*b*, in a manner analogous to 10*a* of FIG. 9. By properly orienting the channels 26, the flow of gas is caused to rotate. If necessary, suitable guiding sheets or rings of blades may be used for this purpose. For the same purpose, however, the sheet-metal body 28 which forms the gap space 27 and which is suspended by conventional means from body 10, may also be rotated during operation.

FIG. 13 shows a modified embodiment in which an inverted dome-shaped insert body 29 is rotated by means of an electric motor 30. Also provided is a blade wheel 38 rotated by motor 30 in order to effect additional dust separation. The bladed wheel 38 includes upwardly tapering means 63, on which the blades are mounted. The upwardly tapering means 63 is rotatably supported from the shaft 30*b* of motor 30. The main gas flow passes through the device in the direction indicated by an arrow 31. The separated coarse dust particles drop to the bottom portion of the separator vessel as is schematically indicated by the arrow 32, while a separation of the middle-sized particles takes place in the sense of the arrow 33. A hollow cone structure 34 is mounted on the blade wheel 38 for sealing purposes. The fine particles are eliminated from the annular channel about the insert 10 in the direction of the arrow 35 in the manner already described above. One or more channels 36 communicate with the annular space about the body 10. These channels 36 may be given an inclined-tangential direction. However, it is also suitable to use a conical slot and to mount guide vanes or the like guide members in the slot for the purpose of obtaining the same directional effect. As is shown in FIG. 13, the motor 30 is supported centrally on a platform 101, which in turn is mounted by means of brackets 102 on the walls of the vessel structure 5. An inner wall 103 tapering upwardly outside of the blade wheel 38 serves to support the annular insert 10 from the brackets 102. The inverted dome-shaped member 29 is rotatably supported from the shaft 104 of motor 30.

Upwardly tapering means 38, 34, 10, 61, 103 are provided coaxially located within the vessel structure above the inlet opening 4 and includes the annular insert structure 10 which is supported by conventional brackets such as 10*a* or 10*b* as shown in FIGS. 9, 12 and 13.

While the embodiments so far described constitute single-stage separators, it is of course also within the purview of our invention to mount a plurality of such separators serially into the main gas path for effecting a plural-stage dust separation. In such cases it is often not necessary to duplicate the entire separators but to confine the series connection to individual components of the separator.

In the embodiment according to FIG. 14, an electric motor 30 imparts rotation to a mushroom-shaped body 37. If desired, a similiar effect can also be produced when using a fixed mushroom-shaped body by providing suitable guiding vanes or the like guiding members. Such a guide member is schematically indicated at 41. The dust-removing pipes 8 are preferably given an inclined tangential direction where they enter into the separator space. The course of the main gas flow is denoted schematically by an arrow 39, and the formation of Taylor rings is symbolically indicated by circular arrows 40. The inserted body 37 may further be provided with nozzle tubes or other nozzle means for superimposing auxiliary flows of gas as schematically indicated at 42.

Figures 15A, 15B, 16:
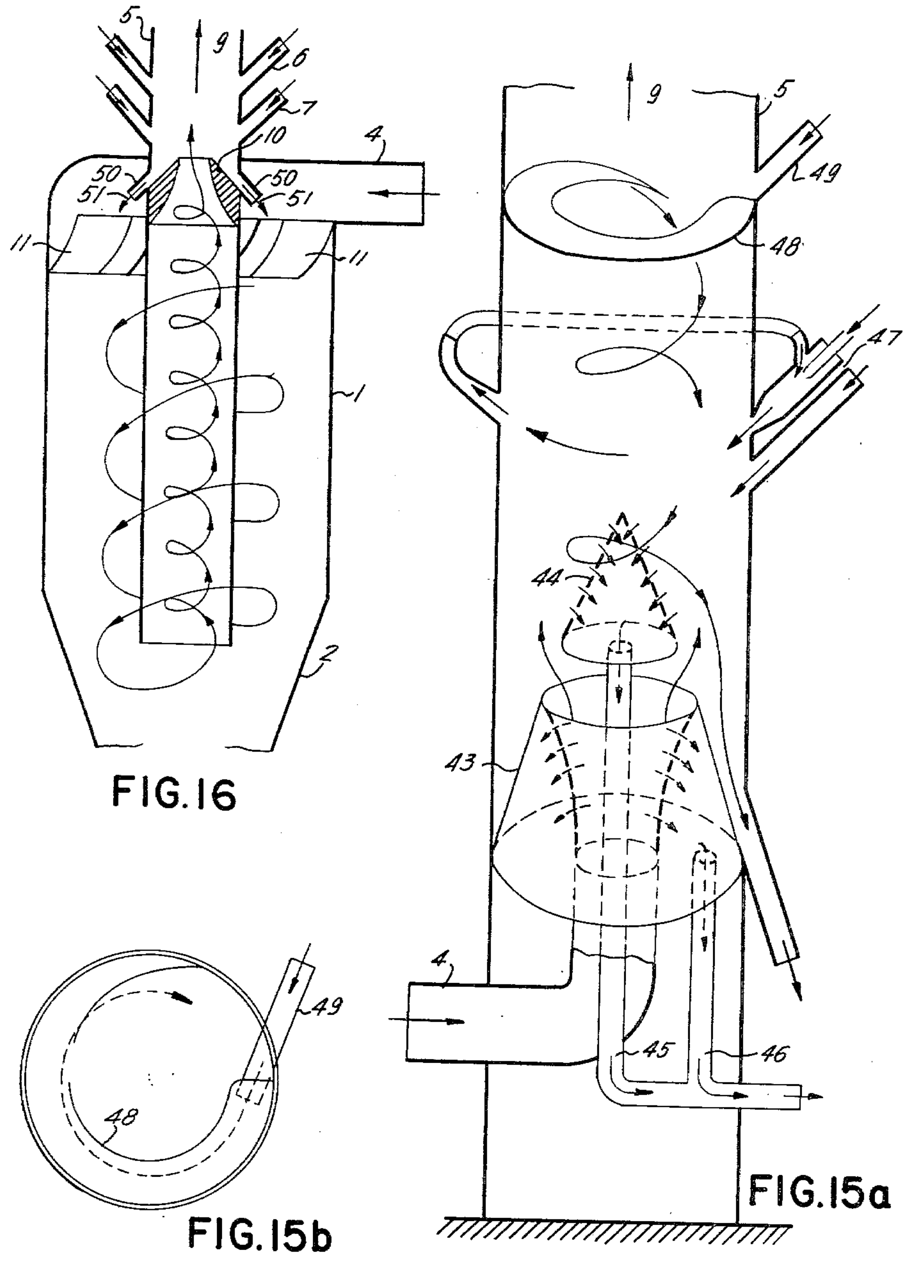
FIG. 16 is a sectional front view of still another embodiment.

The dust separator shown in FIGS. 15*a* and 15*b* receives dust-laden gas through the inlet conduit 4 to which, within the separator vessel, a centrifugating motion and simultaneously a secondary circulatory flow is imparted by a supply of secondary gas entering through nozzle tubes 47 of the design and operation described above with reference to tubes 6 and 7 (FIGS. 1 to 4). The inlet conduit 4 has an upwardly extended portion which widens toward its outlet opening and has a perforated peripheral wall. This upper portion is surrounded by a hollow frusto-conical sheet-metal structure 43. A conical sheet-metal body 44, also perforated, is mounted centrally above the opening of the conduit 4. During operation, the dust separated within the bodies 43 and 44 is withdrawn by suction through the perforations into respective dust discharge tubes 45 and 46 (boundary-layer suction). The occurring flow directions are symbolically illustrated by arrows. Located above the nozzle tubes 47 is a catch nozzle. The separator space proper is covered by a helical sheet-metal body 48 which provides an inclined tangential flow path for auxiliary gas blown into the vessel through a nozzle pipe 49. The supply of auxiliary gas through nozzle pipe 49 contributes to stabilizing the gas flow above the opening of nozzle 47.

The separator according to FIG. 16 is similar to the one described above with reference to FIG. 5 except that the fine dust separated around the ring-shaped insert body 10 is not separately removed from the separator but passes through ducts 50 or a corresponding annular gap back into the separator vessel as is indicated by arrows 51. Guiding vanes 11 between the gas-inlet conduit 4 and the separator chamber within the vessel portion 1 are mounted on the vessel at their periphery whereas the centrally located vane edges are kept free.

Figure 17:
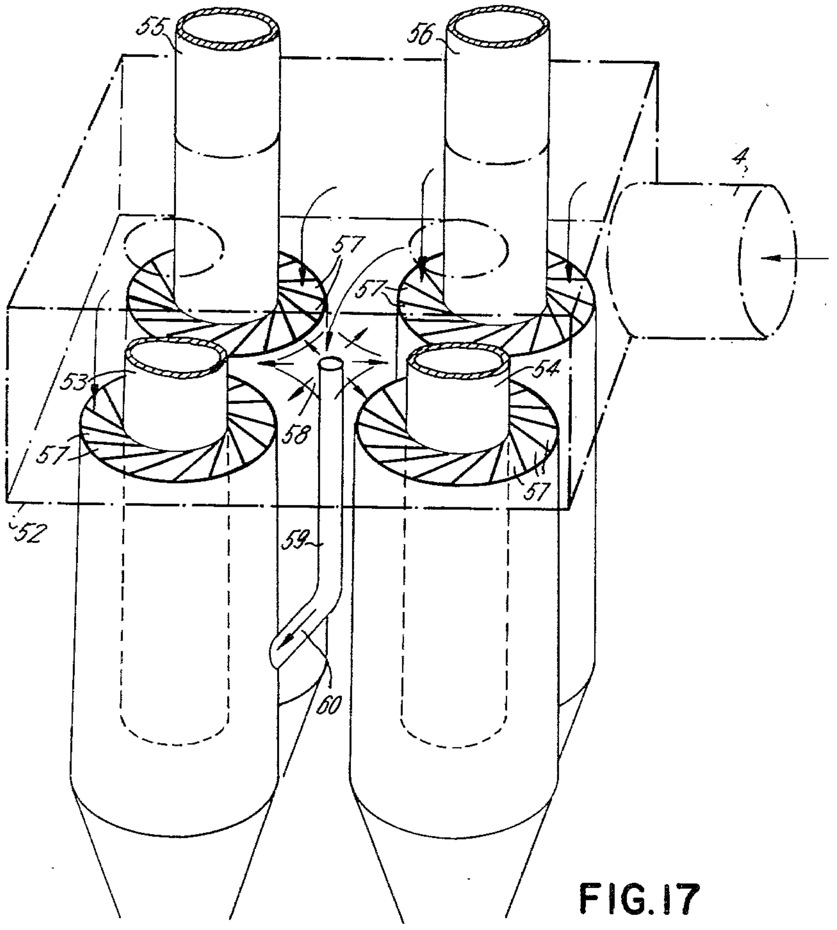
FIG. 17 is a schematic and perspective illustration of a multiclone apparatus.

The assembly illustrated in FIG. 17 constitutes a multiclone comprising four individual dust separators. A housing 52 of rectangular cross section comprises four cylindrical separator vessels 53, 54, 55 and 56 with respective ring assemblies of guiding vanes 57. Dust-laden gas is supplied to the rectangular housing 52 through an inlet conduit 4 from which it passes between the guiding vanes 57 into each of the four separator vessels. Each of the separators may otherwise be designed as described above with reference to the embodiments shown in the preceding illustrations. During operation the back pressure occurring in front of the separator inlet openings may result in a dust collection within the housing 52 at locations of which one is designated by 58. The dust here collecting is removed from the housing by producing at this location a negative pressure with the aid of an exhaust pipe 59 which may pass the dust into the environment. However, it is preferable, as shown, to have each exhaust pipe 59 enter tangentially inclined into the lower portion of one of the separator vessels as is indicated by an arrow 60.

It will be obvious to those skilled in the art, upon a study of this disclosure, that our invention permits of a variety of modifications and hence may be given embodiments other than particularly illustrated and described herein, without departing from the essential features of our invention and within the scope of the claims annexed hereto.

We claim:

1. A particle-from-gas separator, comprising a vessel structure defining vessel walls and a generally vertical axis and forming a centrifugal-action separator chamber of circular horizontal cross section, said chamber having a bottom portion, means forming a main inlet duct having an opening communicating with said chamber for supplying a primary flow of particle-laden gas to said chamber, said main inlet duct means including means for providing rotating motion to the gas entering said separator chamber, means forming a gas outlet portion communicating above said main inlet duct with said chamber and extending upwardly away from said chamber, secondary gas supply means for supplying an additional quantity of gas to said vessel structure and mounted tangentially on said gas outlet portion and angularly inclined downwardly relative to said axis so as to discharge secondary gas into said gas outlet portion and against the direction of said primary gas flow so as to produce a vortex sink and a vortex source in the primary gas flow and so as to superimpose a circulatory flow on said primary gas flow, and upwardly tapering means coaxially located within said vessel structure above said inlet opening and including an annular insert structure forming with said vessel walls an annular collecting space for receiving dust particles.

2. A separator according to claim 1, said upwardly tapering means further including an upwardly tapering drop-shaped insert supported within said gas outlet portion above said annular insert structure for fixing the location of said vortex source.

3. A separator according to claim 1, said upwardly tapering means further including a blade wheel coaxially mounted in said vessel structure for inducing a centrifugating gas flow in said chamber to enhance the dust separation, and drive means operably connected with said blade wheel for rotating the latter during separating operation.

4. A separator according to claim 3, said upwardly tapering means further including a hollow conical structure mounted on said blade wheel and extending partially within said annular insert structure for sealing said blade wheel against said annular insert structure.

5. Apparatus according to claim 3, and including an inverted dome-shaped body spaced from and mounted below said blade wheel and rotatable by said drive means for enhancing the dust separation.

References Cited by the Examiner

UNITED STATES PATENTS

| | | | |
|---|---|---|---|
| 446,053 | 2/91 | Bittinger | 55—261 |
| 1,818,905 | 8/31 | McGee. | |
| 1,958,577 | 5/34 | Hirshfeld. | |
| 2,010,231 | 8/35 | Heist | 55—459 |
| 2,074,818 | 3/37 | Watson | 55—458 |
| 2,100,112 | 11/37 | Taylor | 55—413 |
| 2,153,026 | 4/39 | Ringius | 55—459 |
| 2,252,581 | 8/41 | Saint-Jacques | 55—459 |
| 2,346,005 | 4/44 | Bryson | 55—459 |
| 2,494,465 | 1/50 | Watson et al. | 55—261 |
| 2,593,718 | 4/52 | Beam | 55—459 |
| 2,650,675 | 9/53 | Yellott | 55—83 |
| 2,681,124 | 6/54 | Kolk | 55—459 |
| 2,773,558 | 12/56 | Arborgh | 55—450 |
| 2,857,980 | 10/58 | Rossum | 210—512 |
| 2,874,118 | 2/59 | Albertsen | 210—512 |

FOREIGN PATENTS

| | | |
|---|---|---|
| 145,188 | 4/36 | Austria. |
| 525,985 | 2/54 | Belgium. |
| 27,154 | 2/55 | Finland. |
| 1,065,207 | 1/54 | France. |
| 752,353 | 7/56 | Great Britain. |

HARRY B. THORNTON, *Primary Examiner.*

HERBERT L. MARTIN, WESLEY S. COLE, *Examiners.*